United States Patent [19]
Kawasaki et al.

[11] Patent Number: 5,883,307
[45] Date of Patent: Mar. 16, 1999

[54] ROTARY PULSE DETECTION MECHANISM

[75] Inventors: Toyotoshi Kawasaki, Kawachinagano; Masaaki Miyano, Sakai, both of Japan

[73] Assignee: Minolta Co., Ltd., Osaka, Japan

[21] Appl. No.: 785,315

[22] Filed: Jan. 21, 1997

[30] Foreign Application Priority Data

Jan. 24, 1996 [JP] Japan ..................................... 8-009953

[51] Int. Cl.⁶ ..................................................... G01P 3/42
[52] U.S. Cl. ........................... 73/488; 200/11 R; 200/179
[58] Field of Search ........................ 73/488; 200/11 DA, 200/11 G, 11 R, 179; 341/16; 324/207.25

[56] References Cited

U.S. PATENT DOCUMENTS

| 4,133,990 | 1/1979 | Wanner | 200/11 R |
|---|---|---|---|
| 4,145,585 | 3/1979 | Iwasaki | 200/11 DA |
| 4,166,200 | 8/1979 | Reichen | 200/11 R |
| 5,686,911 | 11/1997 | Nakaho | 341/16 |

FOREIGN PATENT DOCUMENTS

4-97308  3/1992  Japan .
5-249358 9/1993  Japan .

Primary Examiner—Christine K. Oda
Attorney, Agent, or Firm—Burns, Doane, Swecker & Mathis, LLP

[57] ABSTRACT

A pulse detection mechanism for detecting the rotation amount of a rotary member and its rotational direction with a high degree of accuracy by reducing the degree of fluctuation in the position of contact between pins and a pulse surface. A rotation shaft to which a pulse plate has been fixed is supported by a shaft insertion hole of a rotation shaft holding member and that of a pin receiving member. Pins are inserted through pin holes formed through the pin receiving member so that one end of each pin contacts the pulse surface and the other end thereof is urged by a leaf spring of a leaf spring member. The pulse surface and the pins are placed in position by the shaft insertion hole of the rotation shaft holding member and that of the pin receiving member so that the pulse detection mechanism so as to prevent a position fluctuation from being reduced greatly.

15 Claims, 7 Drawing Sheets

ROTARY PULSE DETECTION MECHANISM

BACKGROUND OF THE INVENTION

1. Field of the Invention

The present invention relates to pulse detection mechanism for detecting pulse signals outputted according to the rotation of a rotary plate having a pulse surface formed thereon. A plurality of electrically conductive areas and insulation areas are formed on the pulse surface alternately with each other. More particularly, the present invention relates to a rotation detection mechanism and in particular, a pulse detection mechanism preferably applicable to a rotation direction detection apparatus for detecting the rotational direction of a rotary member which rotates in opposite directions. More specifically, the present invention relates to a pulse detection mechanism preferably applicable to a rotation detection apparatus for detecting the rotation operation amount of a lens barrel of a camera or the like and the rotational direction of the lens barrel.

2. Description of the Related Art

A pulse detection mechanism for detecting the rotation amount and/or rotation direction of a rotary member has been hitherto utilized. The pulse detection mechanism has a substrate having a pulse surface formed thereon and brushes which contact the pulse surface. In the pulse detection mechanism, the pulse surface and the brushes rotate relative to each other in association with the rotation of the rotary member. The pulse detection mechanism detects pulse signals outputted according to the relative rotation of the pulse surface and the brushes. Various types of pulse detection mechanism have been proposed. Hitherto, brush method has been mainly adopted in this kind of pulse detection mechanism. For example, in the construction of the lens barrel disclosed in Laid-Open Japanese Patent Publication No. 4-97308, in order to detect the rotational position of a zooming ring, the pulse detection mechanism comprises the fixed circuit substrate having the pulse surface formed thereon and the brushes which cooperates with the pulse surface and rotates together with the zooming ring.

The brush method has, however, a disadvantage that errors are liable to occur in detecting the rotation amount of a rotary member and the rotational direction thereof. That is, in the brush method, a brush which contacts the pulse surface is composed of a flexible flat and long metal strip. Therefore, when the width of electrically conductive portions and that of insulation portions are small, the position of contact between the brush and the pulse surface fluctuates greatly.

SUMMARY OF THE INVENTION

It is accordingly a main object of the present invention to provide a pulse detection mechanism which detects the rotation amount of a rotary member and/or its rotational direction with a high degree of accuracy by reducing the degree of fluctuation in the position of contact between a contact member and a pulse surface.

In order to solve the above-described technical problems, there is provided a pulse detection mechanism having the following construction.

A pulse detection mechanism for detecting a rotation of a rotating member, comprises a rotary plate interlocked with a rotation of the rotating object and having a pulse surface on one surface thereof on which a plurality of electrically conductive areas and insulation areas are formed alternately with each other in a circumferential direction thereof; pin means electrically conductive and placed at positions at which the pin means contacts the pulse surface in confrontation therewith; and a pulse signal output terminal for outputting pulse signals detected from the pin means.

In the pulse detection mechanism of the present invention, pin means is adopted instead of a brush. If pin means are held at right angles with the pulse surface, the position of pin means which contacts the pulse surface can be held at predetermined positions with a high degree of accuracy.

In the above construction, the position fluctuation of the point of contact between the pulse surface and the pin means depends on process accuracy of the pin means and that of a pin holding member. It is comparatively easy to manufacture the pin means and the pin holding member with a high degree of accuracy. Accordingly, the above construction reduces the position fluctuation of the point of contact between the pulse surface and the pin means, thus improving detection accuracy.

The pin means is held at predetermined positions by the pin holding member. The pin holding member has insulation property and has a pin hole penetrating through the pulse surface substantially perpendicular thereto. The pin means is slidably held by the respective pin hole such that the pin means is substantially perpendicular to the pulse surface.

Preferably, the pin means is formed of a large-diameter portion having a diameter greater than that of each pin hole of the pin holding member and a small-diameter portion to be inserted through the pin hole.

The small-diameter portion of the pin means is slidably inserted through the pin hole and the front end of the pin means contacts the pulse surface of the rotary plate. The large-diameter portion of the pin means projects outside from the pin hole and is pressed by a pin urging member.

Preferably, the pin urging member has an electrically conductive leaf spring so that pulse signals are transmitted from the pin means to pulse signal output terminals through the leaf spring.

Preferably, the pulse detection mechanism according to claim 5, wherein one end of the leaf spring is constituted as a fixed end and the other end thereof is constituted as a free end for urging the pin means against the pulse surface of the rotary member, with the other end in contact with the pin means; and a spring force acts between the fixed end and the free end. The leaf spring urges the pin means elastically, thus bring the pin means into contact with the pulse surface.

A rotation shaft of the rotary plate which rotates in unison with the rotating member is provided at a rotation center of the pulse surface of the rotary plate. The pin holding member has a shaft hole for rotatably holding the rotation shaft therein. The rotation shaft holding member has a shaft hole for holding an extension portion, of the rotation shaft of the rotary plate, which extends in a direction opposite to a direction in which the pulse surface is positioned. A rotation transmission means consisting of a gear or a friction wheel for transmitting a rotation of the rotating member to the rotary plate is fixed to the extension portion of the rotation shaft of the rotary plate.

The pulse surface of the rotary plate has a common electrically conductive area circumferentially formed and electrically connected with the electrically conductive areas; and the pin means comprises a first pin and a common pin. The first pin is electrically conductive and placed at a position at which the first pin contacts the electrically conductive areas and the insulation areas in confrontation therewith. The common pin is placed at a position at which the common pin contacts the common electrically conductive area in confrontation contact therewith.

In the above construction, the first pin consisting of a single pin is sufficient for detecting only the rotation amount of the rotating member. The first pin may include a plurality of pins, typically two first pins, to detect the rotation direction of the rotating member. The pins are electrically conductive and placed at positions at which the pins contact the pulse surface in confrontation therewith and are shifted circumferentially from each other. The distance between the center of the rotary plate and the pins are equal.

Further, according to the present invention, there is provided a rotation detection method for detecting a rotation of a rotating member by using a pulse detection mechanism. The pulse detection mechanism includes a rotary plate interlocked with a rotation of the rotating member and having a pulse surface on one surface thereof on which a plurality of electrically conductive areas and insulation areas are formed alternately with each other in a circumferential direction thereof. The rotation detection method comprises the steps of; urging pin means so that one end of the pin means contact with the pulse surface of the rotary plate rotating, and outputting pulse signals from the rotating pulse surface by means of the pin means.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

A rotation direction detection mechanism according to embodiments of the present invention will be described in detail below with reference to FIGS. 1 through 11.

Figure 1:
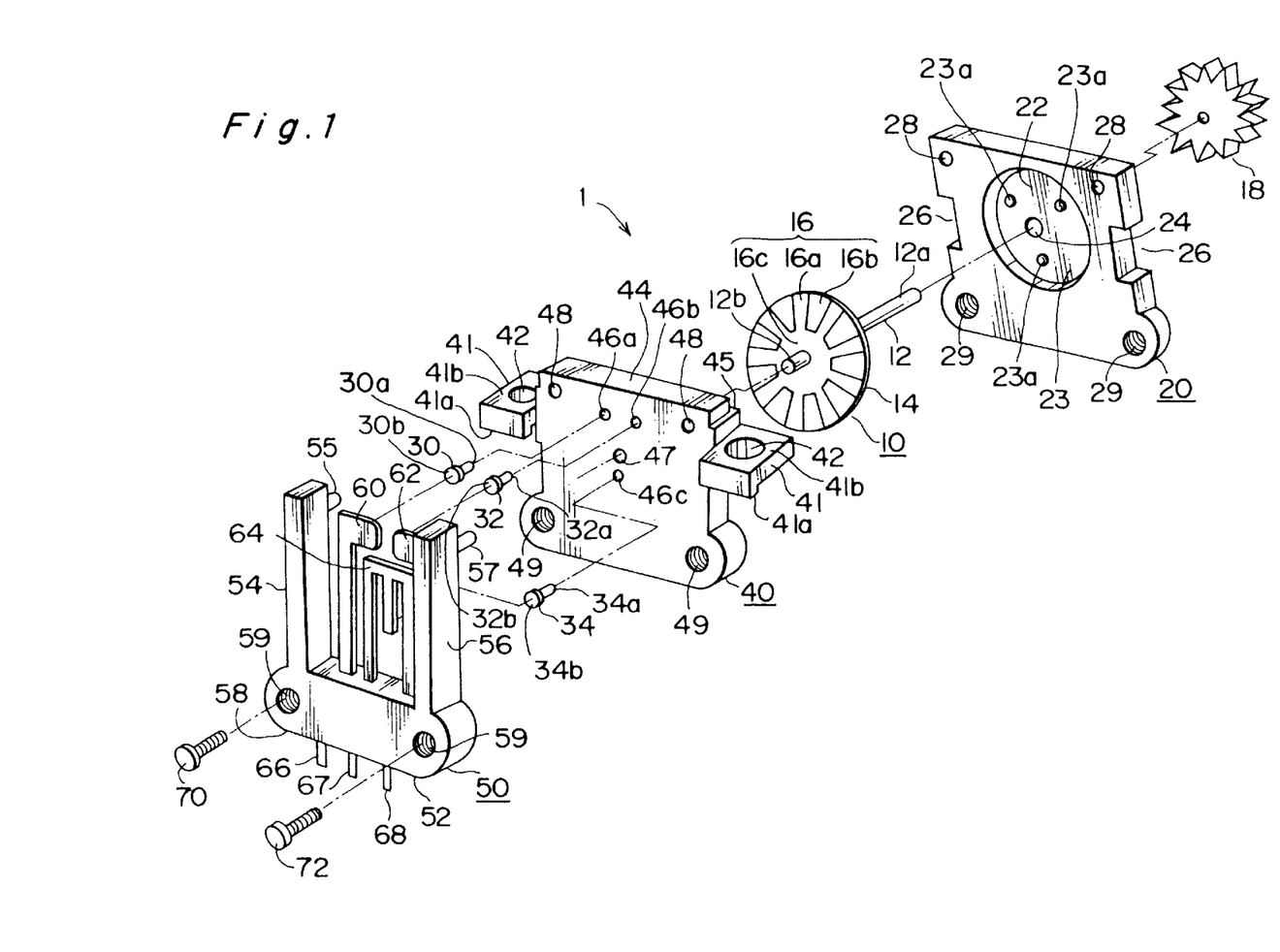
FIG. 1 is an exploded perspective view showing a rotation detection mechanism according to the present invention.
Figure 2:
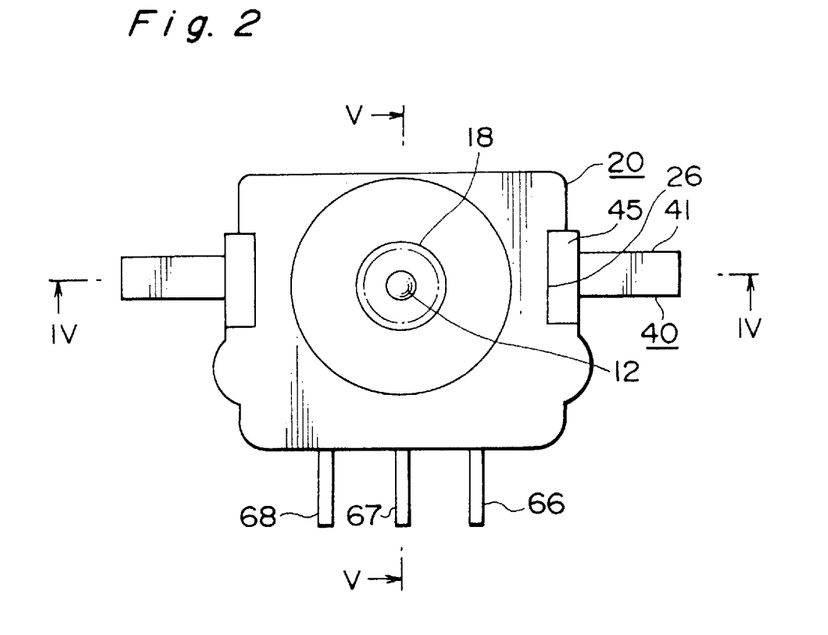
FIG. 2 is a rear view showing the rotation detection mechanism shown in FIG. 1.

The rotation direction detection mechanism is a rotation detection mechanism 1 to be used to detect the rotation direction of an operation ring of a power zoom lens of a camera. The rotation detection mechanism 1 is capable of detecting the amount of rotation of the zoom lens as well as the rotation direction thereof. As shown in FIG. 1, the rotation detection mechanism 1 essentially comprises a rotary member 10; a gear 18, a rotation shaft holding member 20; a pin receiving member 40; first, second, and third pins 30, 32, and 34; a leaf spring member 50; and fixing screws 70 and 72.

The rotary member 10 comprises a rotary plate, namely, a pulse plate 14 and a rotation shaft 12 penetrating through the pulse plate 14 and projecting therefrom in both sides thereof. One side of the pulse plate 14 is formed as a pulse surface 16. The pulse surface 16 has a circular common electrically conductive area 16c positioned at the radially inner side of the pulse surface 16; a plurality of electrically conductive areas 16a radially extending from the common area 16c; a plurality of insulation areas 16b alternating with the electrically conductive areas 16a. The common areas 16c is electrically conductive and electrically connected with the electrically conductive areas 16a.

The gear 18 is fixed to one end 12a, of the rotation shaft 12, positioned at the side opposite to the side at which pulse surface 16 is positioned.

The rotation shaft holding member 20 is an approximately rectangular-shaped insulation member and has a circular pulse plate-accommodating concave 22 at one surface thereof and a shaft insertion hole 24 penetrating through the center of the pulse plate-accommodating concave 22. Three projections 23a are formed on the bottom surface of the pulse plate-accommodating concave 22. Engaging notches 26 are formed at the right and left peripheries of the rotation shaft holding member 20. A pair of positioning holes 28 are formed proximately to the upper right and left corners of the rotation shaft holding member 20. Screw holes 29 are formed proximately to the lower right and left corners of the rotation shaft holding member 20.

The pin-receiving member 40 serving as an insulation member comprises an approximately rectangular plate-shaped body 44 and approximately rectangular plate-shaped installing flanges 41, one of which is fixed to the right periphery of the body 44 and the other of which is fixed to the left periphery thereof at right angles therewith. The body 44 comprises first, second, and third pin holes 46a, 46b, and 46c and a shaft insertion hole 47 formed at predetermined positions and penetrating therethrough. The body 44 has two positioning through-holes 48, one of which is formed proximately to the upper right corner thereof and the other of which is formed proximately to the upper left corner thereof and two through-holes 49, one of which is formed proximately to the lower right corner thereof and the other of which is formed proximately to the lower left corner thereof. The body 44 further comprises a pair of right and left engaging shoulder portions 45 proximate to the right and left installing flanges 41, respectively. The right and left shoulder portions 45 engage the right and left engaging notches 26 of the rotation shaft holding member 20, respectively. Each installing flange 41 has a through-hole 42 penetrating therethrough in the direction in which the body 44 extends.

The first, second, and third pins 30, 32, and 34 are electrically conductive and are slidably inserted into the first, second, and third pin holes 46a, 46b, and 46c of the body 44 of the pin-receiving member 40, respectively. Each of the first, second, and third pins 30, 32, and 34 is constituted of large-diameter head portions 30b, 32b, and 34b each having a diameter larger than that of the corresponding pin hole and of small-diameter leg portions 30a, 32a, and 34a to be inserted into the corresponding pin hole.

The leaf spring member 50 formed by insert molding comprises a body 52; first, second, and third leaf springs 60, 62, and 64; and first, second, and third terminals 66, 67, and 68. The first, second, and third leaf springs 60, 62, and 64 constitute an urging means for urging the first, second, and third pins 30, 32, and 34, respectively.

The body 52 of the leaf spring member 50 which is an approximately U-shaped insulation member has a bottom bar 58 and left and right arms 54 and 56 extending from each of the left and right ends of the bottom bar 58 at right angles therewith. Positioning projections 55 and 57 extend from an upper portion of each of the left arm 54 and the right arm 56 such that they are perpendicular to the bottom bar 58 and left arm 54 and the right 56. The bottom bar 58 has through-holes formed at the left and right ends thereof.

Figure 3:
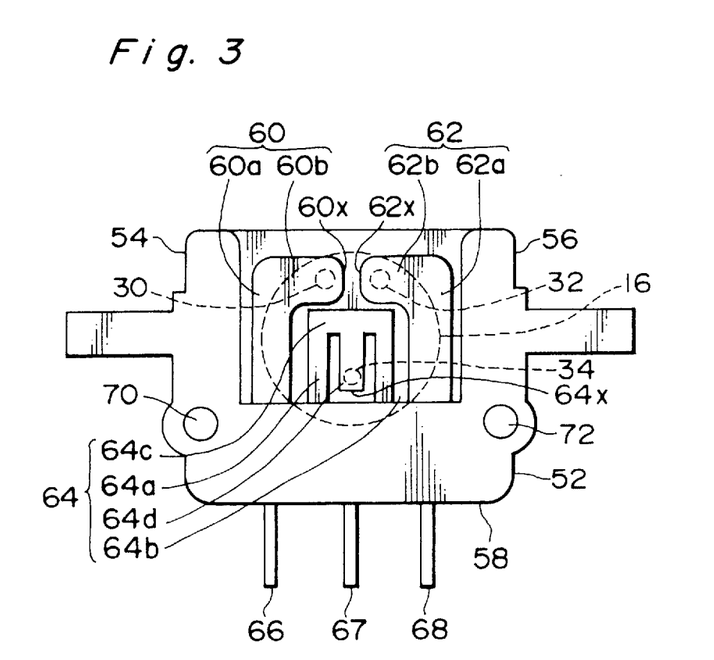
FIG. 3 is a front view showing the rotation detection mechanism shown in FIG. 1.

The first, second, and third leaf springs 60, 62, and 64 are supported by the bottom bar 58 and extend vertically, namely, in the direction in which the left and right arms 54 and 56 extend. As shown in FIG. 3 showing the rotation detection mechanism, the first and second leaf springs 60 and 62 are approximately L-shaped electrical conductive members. The first leaf spring 60 comprises a first arm 60a and a second arm 60b forming an angle of 90° therebetween. Similarly, the second leaf spring 62 comprises a first arm 62a and a second arm 62b forming an angle of 90° therebetween. One end of the first arm 60a of the first leaf spring 60 is fixed to the bottom bar 58, with the first arms 60a adjacent to the left part 54 of the body 52 forming an angle of 90° with the second arm 60b. Similarly, one end of the first arm 62a of the second leaf spring 62 is fixed to the bottom bar 58, with the first arm 62a adjacent to the right part 56 of the body 52 forming an angle of 90° with the second arm 62b. The other end, namely, free end 60x of the second arm 60b of the first leaf spring 60 confront the other end, namely, free end 60y of the second arm 62b of the second leaf spring 62. The third leaf spring 64 serving as an approximately ω-shaped electrical conductive member comprises a left arm 64a, a right arm 64b, an upper arm 64c, and a center 64d. More specifically, one end of the left arm 64a and that of the right arm 64b are fixed to the bottom bar 58 of the body 52 such that the left arm 64a is positioned inward from the first arm 60a of the first leaf spring 60; the right arm 64b is positioned inward from the second arm 60b; the upper arm 64c is located below the lower end of the second arm 60b and that of the second arm 62b; and the lower end of the center arm 64d confronts the upper surface of the bottom bar 58 and serves as the free end 64x of the third leaf spring 64.

The first, second, and third terminals 66, 67, and 68 are fixed to the lower part of the bottom bar 58 and electrically connected with the first, second, and third leaf springs 60, 62, and 64, respectively, thus serving as pulse signal output terminals.

The rotation detection mechanism 1 is assembled as shown in FIGS. 2 through 5.

First, the rotation shaft 12 of the rotary member 10 is inserted into the shaft insertion hole 24 of the rotation shaft holding member 20, and the pulse plate 14 of the rotary member 10 is accommodated in the pulse plate-accommodating concave 22 of the rotation shaft holding member 20. At this time, the pulse surface 16 of the pulse plate 14 and the bottom surface 23 of the pulse plate-accommodating concave 22 are positioned back to back.

Then the other end 12a of the rotation shaft 12 of the rotary member 10 is inserted into the shaft insertion hole 47 of the pin-receiving member 40, and the engaging notches 26 of the rotation shaft holding member 20 are engaged by the shoulder portions 45 of the pin-receiving member 40. In this manner, the pin-receiving member 40 is brought into close contact with the rotation shaft holding member 20.

One end 30a, 32a, and 34a of each of the first, second, and third pins 30, 32, and 34 are inserted into the first, second, and third pin holes 46a, 46b, and 46c of the 40, respectively to bring the leaf spring member 50 into close contact with the pin-receiving member 40 by inserting the positioning projection 55 of the left arm 54 of the body 52 of the leaf spring member 50 and the positioning projection 57 of the right arm 56 of the body 52 thereof through the left positioning hole 48 and the right positioning hole 48 of the pin-receiving member 40 and pressing the positioning projections 55 and 57 into the left and right positioning holes 28 of the rotation shaft holding member 20.

Then, fixing screws 70 and 72 are inserted through-holes 59 of the body 52. Then, the fixing screws 70 and 72 are inserted through the through-holes 49 of the pin-receiving member 40, and then, screwed into the screw holes 29 of the rotation shaft holding member 20. Thereby, the rotation shaft holding member 20, the pin-receiving member 40, and the leaf spring member 50 are held together as a unit. Then, the gear 18 is fixed to one end 12a of the rotation shaft 12 of the rotary member 10.

Figure 4:
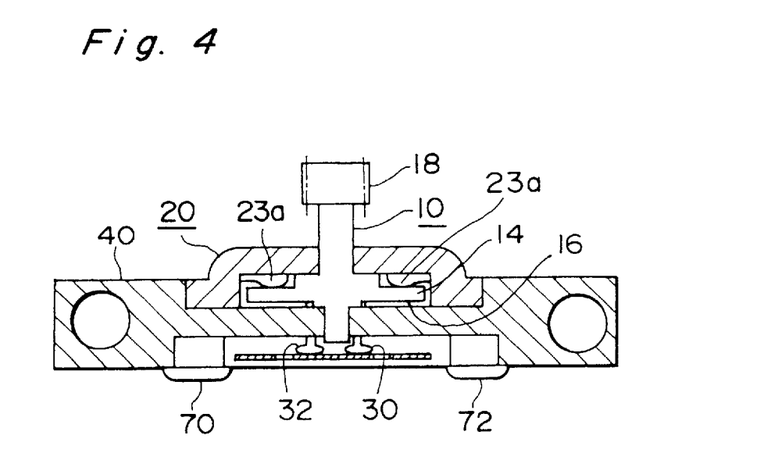
FIG. 4 is a sectional view taken along a line IV—IV of FIG. 2.
Figure 5:
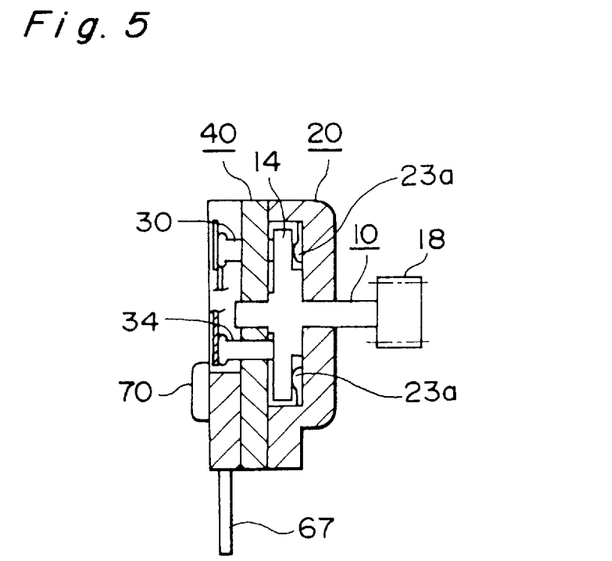
FIG. 5 is a sectional view taken along a line V—V of FIG. 2.

In the rotation detection mechanism 1 thus assembled, the rotary member 10 is rotatably supported by the shaft insertion hole 24 of the rotation shaft holding member 20 and the shaft insertion hole 47 of the pin-receiving member 40. As shown in FIGS., 4 and 5, the pulse plate 14 of the rotary member 10 is substantially sealed between the rotation shaft holding member 20 and the pin-receiving member 40. Therefore, dust or the like can be prevented from penetrating into the gap between the pulse plate 14 and the rotation shaft holding member 20 as well as the pin-receiving member 40.

One end 30a, 32a, and 34a of each of the first, second, and third pins 30, 32, and 34 inserted through the pin-receiving member 40 contact the pulse surface 16 of the pulse plate 14. The peripheral portion of each of the free ends 60x, 62x, and 64x of each of the first, second, and third leaf springs 60, 62, and 64 contacts each of the other ends 30b, 32b, and 34b of each of the first, second, and third pins 30, 32, and 34. The first, second, and third pins 30, 32, and 34 are urged toward the pulse surface 16 of the pulse plate 14 by the first, second, and third leaf springs 60, 62, and 64, respectively. Thereby, the first, second, and third pins 30, 32, and 34 contact the pulse surface 16 of the pulse plate 14 stably. Because the side of the pulse plate 14 opposite to the pulse surface 16 thereof contacts the projections 23a of the bottom surface 23 of the pulse plate-accommodating concave 22 slidably, the axis of the pulse plate 14 is not decentered even though the pulse plate 14 is urged toward the rotation shaft holding member 20 by the first, second, and third pins 30, 32, and 34. Because the first, second, and third pins 30, 32, and 34 are urged toward the pulse surface 16 of the pulse plate 14 by the first, second, and third leaf springs 60, 62, and 64, respectively, it is allowed that the pulse surface 16 is irregular in some extent, but preferably, the pulse surface 16 is smooth.

The relationship between the positions of the first, second, and third pins 30, 32, and 34 and the position of the pulse plate 14 is determined according to the position of the first, second, and third pin holes 46a, 46b, and 46c, and the shaft-insertion hole 47 all formed on the pin-receiving member 40. That is, the position of contact between the first, second, and third pins 30, 32, and 34 and the pulse surface 16 of the pulse plate 14 is determined by the position of the holes formed on the pin-receiving member 40. Generally, in the recent hole-forming technique, it is easy to form holes at predetermined positions with a high degree of accuracy. Accordingly, the first, second, and third pins 30, 32, and 34 can be formed at predetermined positions with a high degree of accuracy.

There is a comparatively long distance between the position of the fixed end part of the leaf spring member 50 and the position at which the first, second, and third leaf springs 60, 62, and 64 contact the first, second, and third pins 30, 32, and 34, respectively. Accordingly, even though the flexure amount of the first, second, and third leaf springs 60, 62, and 64 fluctuates when they contact the first, second, and third pins 30, 32, and 34, the first, second, and third pins 30, 32, and 34 are urged by the first, second, and third leaf springs 60, 62, and 64 at a constant force. Thus, the rotation detection mechanism 1 is allowed to operate stably, thus providing a high degree of detection accuracy.

The first, second, and third leaf springs 60, 62, and 64 can be positioned so as to overlap with the pulse surface 16 of the pulse plate 14 with the pin-receiving member 40 is interposed therebetween. Thus, the first, second, and third leaf springs 60, 62, and 64 can be arranged within the area of the pulse surface 16 to miniaturize the rotation detection mechanism 1.

The detailed construction of the rotation detection mechanism 1 and its operation will be described below.

When the gear 18 is rotated by an unshown rotation transmission mechanism connected with an object, the rotation direction of which is to be detected, the pulse plate 14 rotates. Consequently, the first and second pins 30 and 32 contact the electrically conductive areas 16a and the insulation areas 16b of the pulse surface 16 of the pulse plate 14 alternately. The third pin 34 contacts the common area 16c constantly. The first, second, and third pins 30, 32, and 34 are electrically connected with the first, second, and third terminals 66, 67, and 68, respectively through the first, second, and third leaf springs 60, 62, and 64. Accordingly, when the first pin 30 or the second pin 32 contacts the electrically conductive areas 16a of the pulse surface 16, the first terminal 66 or the second terminal 67 is conductive to the third terminal 68, whereas when the first pin 30 or the second pin 32 contacts the insulation areas 16b of the pulse surface 16, the first terminal 66 or the second terminal 67 is unconductive to the third terminal 68. Therefore, a pulse signal can be obtained between the first terminal 66 and the third terminal 68 and between the second terminal 67 and the third terminal 68.

The first and second pin holes 46a and 46b of the pin-receiving member 40 are formed so that the phase of the pulse signal between the first terminal 66 and the third terminal 68 shifts by about 90° from that of the pulse signal between the second terminal 67 and the third terminal 68. That is, the positions of the first and second pin holes 46a and 46b are formed so that when one end 30a of the first pin 30 or one end 32a of the second pin 32 contacts the boundary between the electrically conductive areas 16a of the pulse surface 16 and the insulation areas 16b thereof, one end 32a of the second pin 32 or one end 30a of the first pin 30 contacts the center or a position proximate to the center of the electrically conductive portions 16a or the insulation portions 16b adjacent to the boundary.

The phase-shifted two pulse signals are processed by a method similar to the conventional method to detect the rotation direction of the object.

The method of installing the rotation detection mechanism 1 on a lens barrel 80 is described below with reference to FIGS. 6 through 10.

Figure 6:
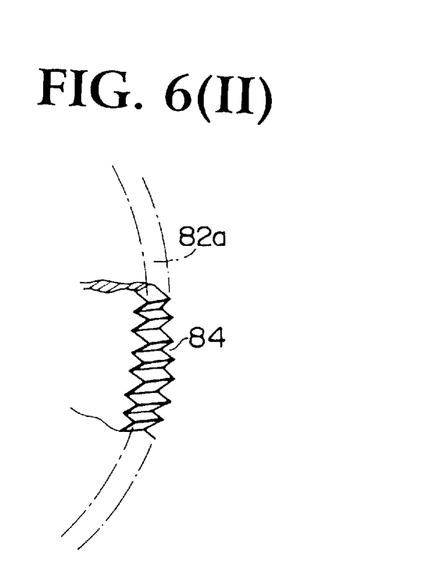
FIG. 6 is a perspective view showing main parts of an operation ring.
Figure 6I:
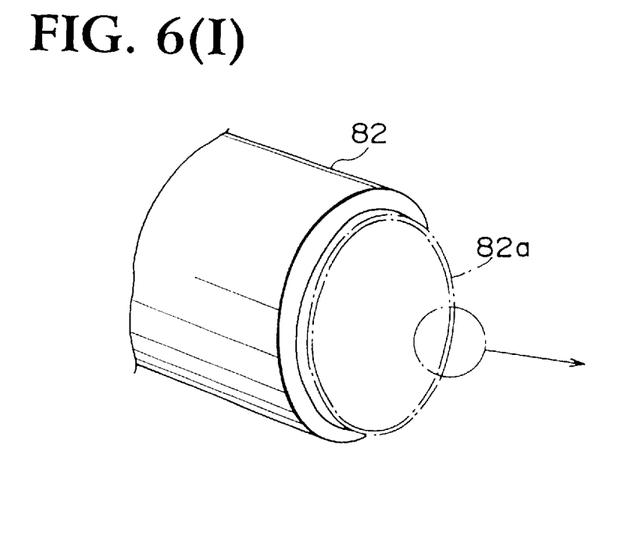
Figure 7:
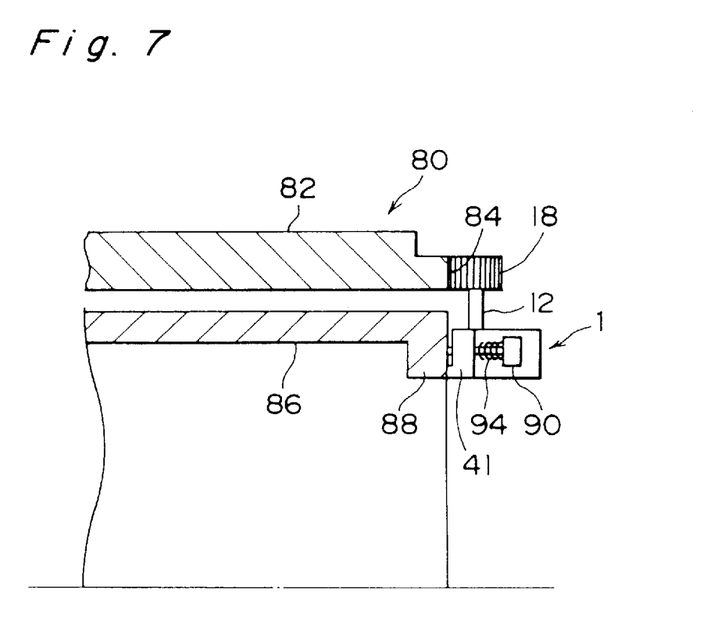
FIG. 7 is a sectional view showing main parts of a lens barrel.
Figure 8:
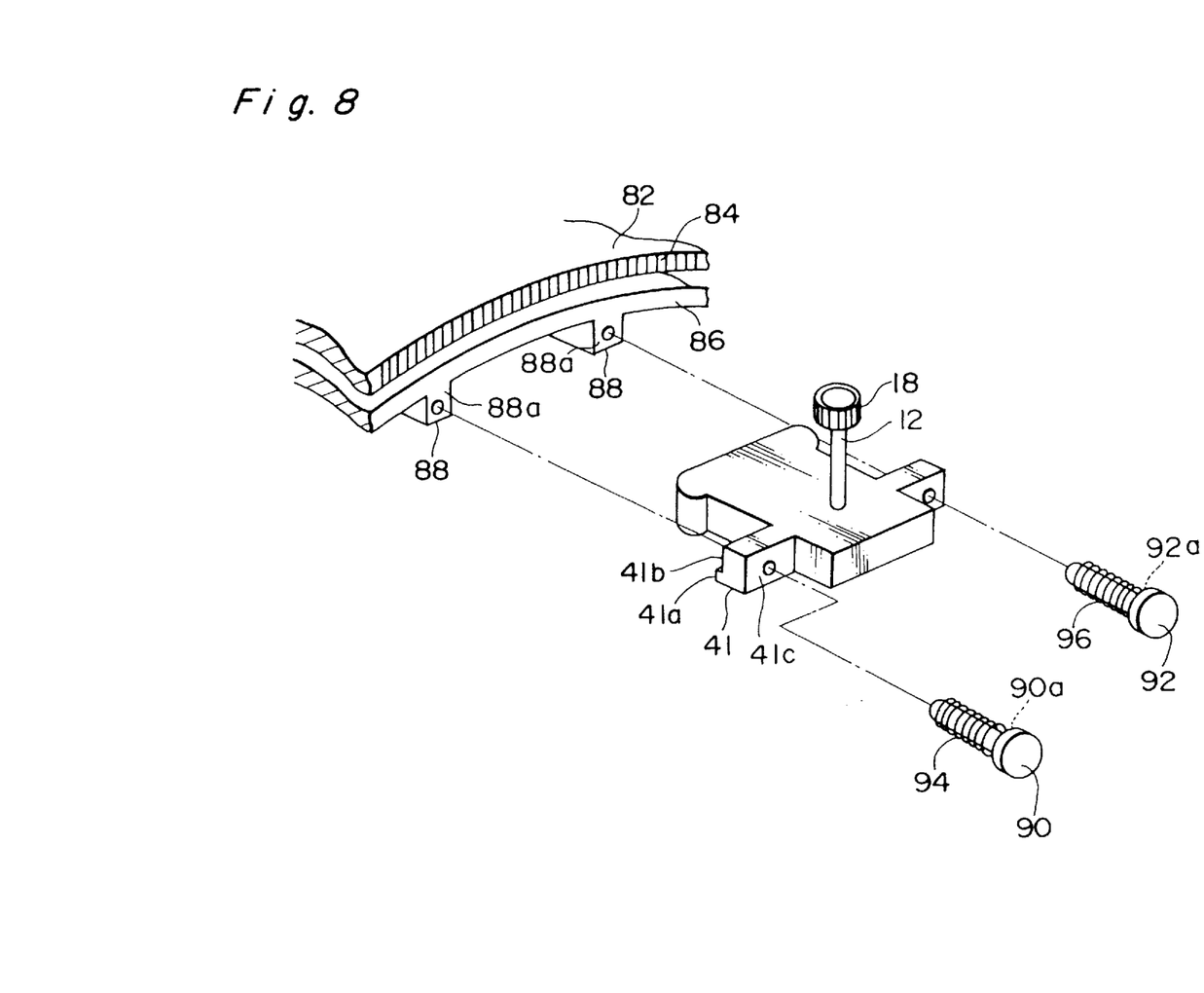
FIG. 8 is an exploded perspective view showing the method of installing the rotation detection mechanism on the lens barrel shown in FIG. 7.

As shown in FIGS. 7 and 8, the lens barrel 80 to which the rotation detection mechanism 1 is fixed comprises a fixing cylinder 86 and an operation ring 82 mounted in the periphery of the fixing cylinder 86. The rotation detection mechanism 1 is installed on an installing portion 88 formed at an end of the fixing cylinder 86 of the lens barrel 80. The gear 18 of the rotation detection mechanism 1 engages a gear 84 of the operation ring 82. As shown in FIG. 6, the gear 84 is formed entirely on an end surface 82a of the operation ring 82. Each tooth flank of the gear 84, namely, each tooth space extends in the radial direction of the operation ring 82, as shown in FIG. 6 (II). It is possible to form the gear 84 on a part of the end surface 82a of the operation ring 82.

The installing flange 41 of the rotation detection mechanism 1 is installed on the installing portion 88 of the fixing cylinder 86, using installing screws 90 and 92. The installing flange 41 is stepped to form first and second surfaces 41a and 41b confronting the installing portion 88 of the fixing cylinder 86 in such a manner that the second surface 41b is located above the first surface 41a and that the distance between the installing portion 88 and the second surface 41b is longer than that between the installing portion 88 and the first surface 41a. Thus, the distance between the gear 18 and the second surface 41b is shorter than that between the gear 18 and the first surface 41a. The through-hole 42 of the installing flange 41 of the rotation detection mechanism 1 is formed through the second surface 41b.

Using the installing screws 90 and 92 and urging springs 94 and 96, the rotation detection mechanism 1 is mounted on the lens barrel 80 by bringing the first surface 41a of the installing flange 41 into contact with an installing surface 88a of the installing portion 88 of the fixing cylinder 86. At this time, there is a certain space between the second surface 41b of the installing flange 41 and the installing surface 88a of the installing portion 88. The installing screws 90 and 92 are inserted through the through-holes 42 of the installing flange 41 and fixed to the installing portion 88 of the fixing cylinder 86. The urging springs 94 and 96 are sandwiched between a third surface 41c of the installing flange 41 and the undersides 90a and 92a of each of the installing screws 90 and 92. Accordingly, the urging springs 94 and 96 urge the third surface 41c of the installing flange 41 toward the fixing cylinder 86.

Figure 9:
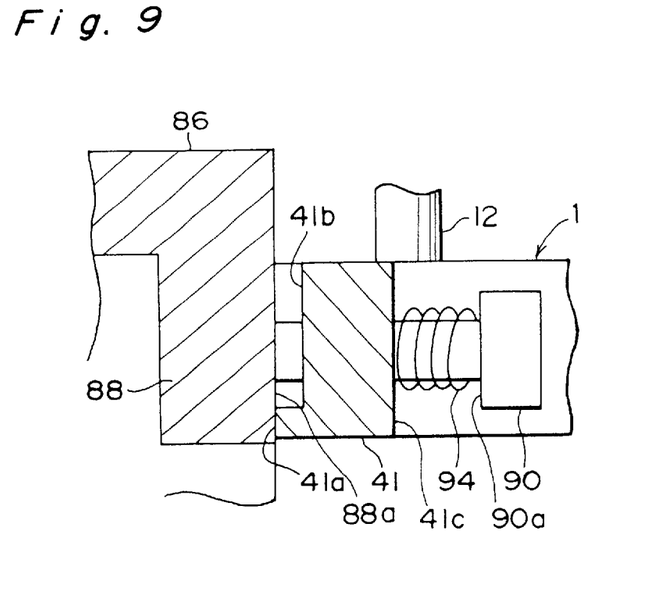
FIG. 9 is a sectional view showing enlarged main parts of the lens barrel shown in FIG. 7.

In the rotation detection mechanism 1 installed on the installing portion 88 of the fixing cylinder 86 as described above, supposing that the rotation detection mechanism 1 has been installed on the lens barrel 80 normally, the entire first surface 41a of the installing flange 41 contacts the installing portion 88 of the fixing cylinder 86 and there is formed a gap between the second surface 41b of the installing flange 41 and the installing portion 88 of the fixing cylinder 86 such that the second surface 41b is parallel with the installing portion 88, as shown in FIG. 9. In this state, the rotation shaft 12 of the rotation detection mechanism 1 extends at a right angle with the optical axis, and the gear 18 of the rotation detection mechanism 1 engages the gear 84 of the operation ring 82, with the gear 18 parallel with the gear 84.

Figure 10:
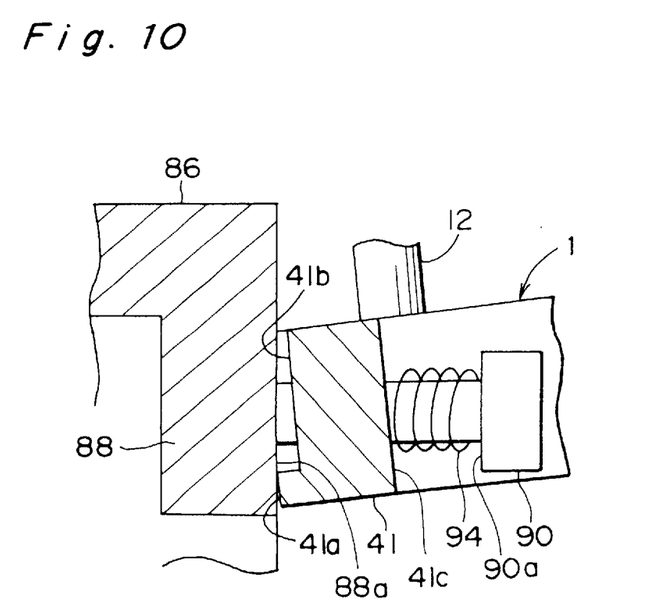
FIG. 10 is a sectional view showing an enlarged main parts of a lens barrel.

If the gap between the gear 18 of the rotation detection mechanism 1 and the gear 84 of the operation ring 82 becomes large due to process error or assembly error, the installing flange 41 is urged by the urging springs 94 and 96. As a result, as shown in FIG. 10, the installing flange 41 pivots counterclockwise on the bottom of the first surface 41a in contact with the installing surface 88a of the installing portion 88. Consequently, the rotation shaft 12 of the rotation detection mechanism 1 pivots counterclockwise and the tilted gear 18 fixed to one end 12*a* of the rotation shaft 12 engages the gear 84 without backlash.

If the gap between the gear 18 of the rotation detection mechanism 1 and the gear 84 of the operation ring 82 becomes small, the gear 84 of the operation ring 82 presses the gear 18 of the rotation detection mechanism 1 outward against the urging force of the urging springs 94 and 96. As a result, the installing flange 41 pivots clockwise on the bottom of the first surface 41*a* in contact with the installing surface 88*a* of the installing portion 88. Consequently, the rotation shaft 12 of the rotation detection mechanism 1 pivots clockwise and the tilted gear 18 fixed to one end 12*a* of the rotation shaft 12 engages the gear 84 without backlash.

Accordingly, even though process error or assembly error occurs, the gear 18 of the rotation detection mechanism 1 engages the gear 84 of the operation ring 82 without backlash. Therefore, the rotation of the object is transmitted to the rotation detection mechanism 1 from the operation ring 82.

Figure 11:
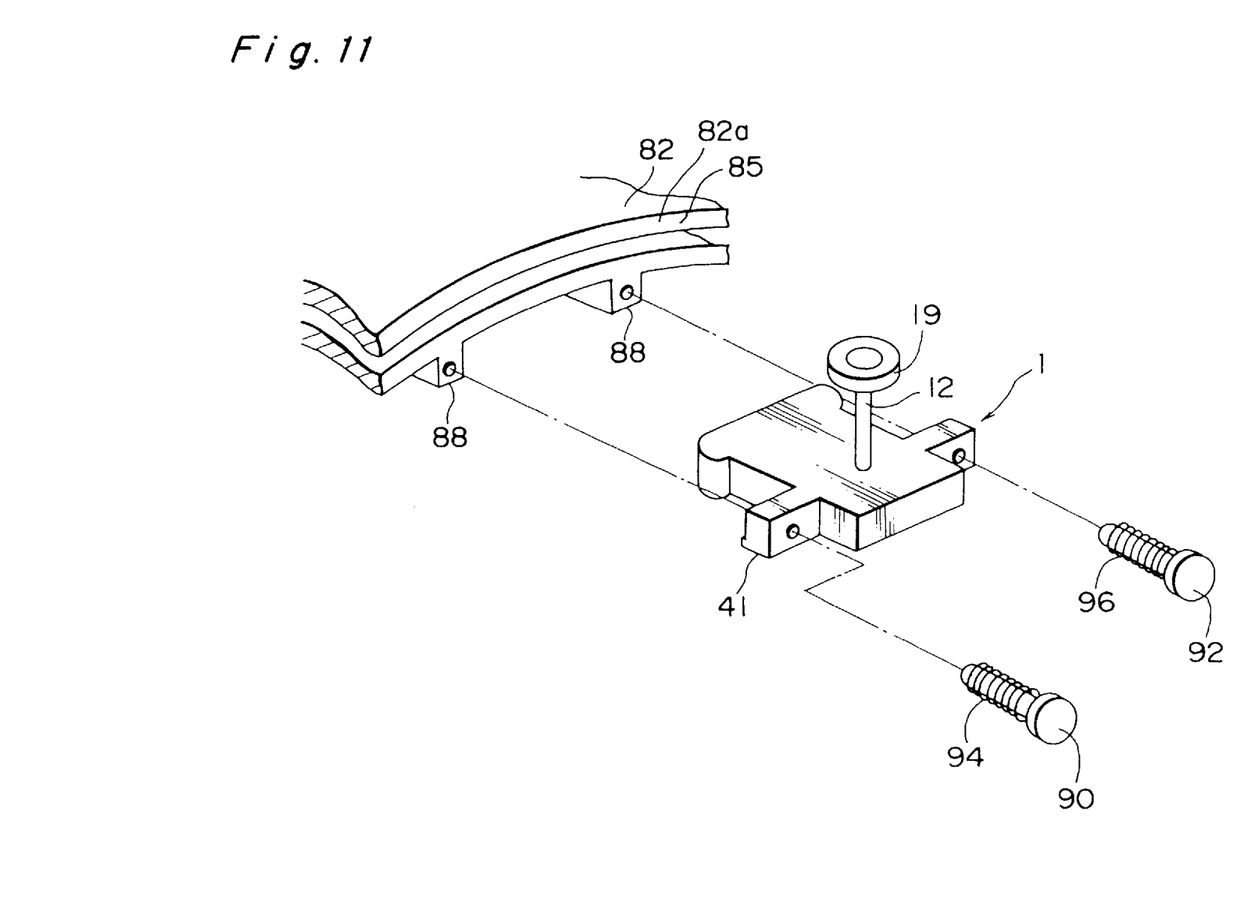
FIG. 11 is an exploded perspective view showing the method of installing a rotation detection mechanism on a lens barrel according to a modification.

Instead of the above-described construction, the rotation detection mechanism 1 may have a construction as shown in FIG. 11. That is, instead of forming the gear 84 on the end surface 82*a* of the operation ring 82, a flat contact surface 85 is formed thereon. In the rotation detection mechanism 1, a friction wheel 19 is fixed to one end 12*a* of the rotation shaft 12 of the rotary member 10. Each of the other members has the same construction as that described above. This construction also allows the contact surface 85 of the operation ring 82 to contact the friction wheel 19 of the rotation detection mechanism 1 without delay in the transmission of the rotation of the object by an appropriate urging force of the urging springs 94 and 96.

The present invention is not limited to the above-described embodiment, but various changes and modification can be made. For example, in the embodiment as described above, one of the first and second pins 30 and 32, e.g. the second pin 32, may be omitted. In this case, although the rotation direction is not detected, the amount of rotation of the zoom lens can be detected.

Therefore, such changes and modifications are to be understood as included within the scope of the present invention as defined by the appended claims unless they depart therefrom.

What is claimed is:

1. A pulse detection mechanism for detecting a rotation of a rotating member, comprising:
   a rotary plate interlocked with a rotation of the rotating member and having a pulse surface on one surface thereof on which a plurality of electrically conductive areas and insulation areas are formed alternately with each other in a circumferential direction thereof;
   electrically conductive pins placed at positions at which the pins contact the pulse surface in confrontation therewith; and
   a pulse signal output terminal for outputting a pulse signal detected from the pins.

2. The pulse detection mechanism according to claim 1, wherein the pins are held at predetermined positions by a pin holding member.

3. The pulse detection mechanism according to claim 2, wherein the pin holding member is insulative and has a plurality of pin holes penetrating through to the pulse surface substantially perpendicular thereto; and the pins are slidably held by the respective pin holes such that the pins are substantially perpendicular to the pulse surface.

4. The pulse detection mechanism according to claim 3, wherein the pins are formed of a large-diameter portion having a diameter greater than that of the pin holes of the pin holding member and a small-diameter portion to be inserted through the pin holes.

5. The pulse detection mechanism according to claim 3, further comprising a pin urging member for urging the pins held by the pin holding member against the pulse surface of the rotary plate so as to bring the pins into contact with the pulse surface.

6. The pulse detection mechanism according to claim 5, wherein the pin urging member has an electrically conductive leaf spring so that the pulse signal is transmitted from the pins to the pulse signal output terminal through the leaf spring.

7. The pulse detection mechanism according to claim 6, wherein one end of the leaf spring has a fixed end and another end thereof has a free end for urging the pins against the pulse surface of the rotary member, with the another end in contact with the pins; and a spring force acts between the fixed end and the free end.

8. The pulse detection mechanism according to claim 2, wherein a rotation shaft of the rotary plate which rotates in unison with the rotating member is provided at a rotation center of the pulse surface of the rotary plate; and the pin holding member has a shaft hole for rotatably holding the rotation shaft therein.

9. The pulse detection mechanism according to claim 8, to claim 8, further comprising a rotation shaft holding member that has a shaft hole for holding an extension portion, of the rotation shaft of the rotary plate, which extends in a direction opposite to a direction in which the pulse surface is positioned.

10. The pulse detection mechanism according to claim 8, further comprising a rotation transmission means including a gear or a friction wheel for transmitting a rotation of the rotating member to the rotary plate and which is fixed to the extension portion of the rotation shaft of the rotary plate.

11. The pulse detection mechanism according to claim 1, wherein the pulse surface of the rotary plate has a common electrically conductive area circumferentially formed and electrically connected with the electrically conductive areas; and the pins include a first pin and a common pin, wherein the first pin is electrically conductive and placed at a position at which the first pin contacts the electrically conductive areas and the insulation areas in confrontation therewith; and the common pin is placed at a position at which the common pin contacts the common electrically conductive area in confrontation contact therewith.

12. The pulse detection mechanism according to claim 1, wherein two of the pins are electrically conductive and placed at positions at which the two pins contact the pulse surface in confrontation therewith and are shifted circumferentially from each other, such that the distance between the center of the rotary plate and the two pins are equal.

13. The pulse detection mechanism of claim 1, wherein the pulse surface includes an inner conductive portion and an outer portion, wherein the outer portion includes the plurality of electrically conductive areas and insulation areas, and each of the plurality of electrically conductive areas is electrically connected to the inner conductive portion.

14. The pulse detection mechanism of claim 3, wherein the pin holding member is stationary.

15. A method for detecting a rotation of a rotating member by using a pulse detection mechanism which includes a rotary plate interlocked with a rotation of the rotating member and having a pulse surface on one surface thereof on which a plurality of electrically conductive areas and insulation areas are formed alternately with each other in a circumferential direction thereof, comprising the steps of:

urging pins so that one end of the pins contacts with the pulse surface of the rotating rotary plate, and outputting pulse signals from the rotating pulse surface by means of the pins.

* * * * *

UNITED STATES PATENT AND TRADEMARK OFFICE
CERTIFICATE OF CORRECTION

PATENT NO. : 5,883,307
DATED : MARCH 16, 1999
INVENTOR(S) : KAWASAKI, et al.

It is certified that error appears in the above-indentified patent and that said Letters Patent is hereby corrected as shown below:

On the cover page, date of filing should be changed as follows:

[22] Filed: Jan. 23, 1997

Signed and Sealed this

Third Day of August, 1999

Attest:

Q. TODD DICKINSON

Attesting Officer

Acting Commissioner of Patents and Trademarks